(12) United States Patent
Zhao et al.

(10) Patent No.: US 6,393,828 B1
(45) Date of Patent: *May 28, 2002

(54) PROTECTIVE COATINGS FOR TURBINE COMBUSTION COMPONENTS

(75) Inventors: Ji-Cheng Zhao, Niskayuna; Yuk-Chiu Lau, Ballston Lake, both of NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,270

(22) Filed: Jul. 21, 1997

(51) Int. Cl.[7] .............................. F02C 1/00; F02C 7/30
(52) U.S. Cl. ..................... 60/39.37; 60/752; 60/753; 428/614
(58) Field of Search ............... 60/39.32, 39.37, 60/752, 753, 754; 428/614

(56) References Cited

U.S. PATENT DOCUMENTS

| | | | | |
|---|---|---|---|---|
| 3,859,061 A | * | 1/1975 | Speirs et al. ................ 428/614 |
| 3,999,985 A | * | 12/1976 | Jones et al. ................ 420/428 |
| 4,195,475 A | * | 4/1980 | Verdouw .................... 60/754 |
| 4,621,499 A | * | 11/1986 | Mori et al. .................. 60/752 |
| 4,719,748 A | * | 1/1988 | Davis, Jr. et al. .......... 60/39.37 |
| 4,938,805 A | * | 7/1990 | Haydon et al. ................ 148/3 |
| 4,942,732 A | * | 7/1990 | Priceman ..................... 60/753 |
| 5,009,070 A | * | 4/1991 | Iizuka et al. .................. 60/753 |
| 5,040,718 A | * | 8/1991 | Lee et al. .................... 228/119 |
| 5,043,138 A | * | 8/1991 | Darolia et al. .............. 428/614 |
| 5,116,690 A | * | 5/1992 | Brindley et al. ............. 428/614 |
| 5,274,991 A | * | 1/1994 | Fitts ........................... 60/39.37 |
| 5,510,080 A | * | 4/1996 | Nishi et al. .................. 420/451 |
| 5,732,467 A | * | 3/1998 | White et al. ................ 29/889.1 |
| 5,749,229 A | * | 5/1998 | Abuaf et al. .................. 60/752 |
| 5,780,171 A | * | 7/1998 | Nissley et al. .............. 428/629 |
| 5,956,845 A | * | 9/1999 | Arnold ....................... 29/889.1 |

FOREIGN PATENT DOCUMENTS

| | | |
|---|---|---|
| DE | 43 21 393 | 1/1995 |
| EP | 0 559 246 | 9/1993 |
| EP | 0 718 419 | 6/1996 |
| EP | 0 814 178 | 12/1997 |
| EP | 0 821 078 | 1/1998 |
| WO | WO 97/02947 | 1/1997 |

\* cited by examiner

Primary Examiner—Ted Kim
(74) Attorney, Agent, or Firm—Robert P. Santandrea; Noreen C. Johnson

(57) ABSTRACT

A turbine combustion system comprises at least one turbine combustion component that is provided with a protective coating on the outer surface otherwise known as the non-flame surface of at least one turbine combustion component. The at least one turbine combustion component comprises an inner surface that defines a hot flame path area and an outer surface. The coating on the outer surface of the combustion components provides protection for the components from at least one of oxidation, nitridation, and hot corrosion.

12 Claims, 7 Drawing Sheets

PROTECTIVE COATINGS FOR TURBINE COMBUSTION COMPONENTS

FIELD OF THE INVENTION

The invention is directed to protective coatings for turbine combustion components. In particular, the invention is directed to protective coatings for outer surfaces of turbine combustion components.

BACKGROUND OF THE INVENTION

The efficiency of turbines, for example gas turbines, is increased as the firing temperature, otherwise known as the working temperature, of the turbine increases. This increase in temperature will result in at least an increase in power with the use of the same, if not less, fuel in a turbine. Thus, it is desirable to raise the firing temperature of a turbine to increase the efficiency.

However, as the firing temperature of gas turbines rises, the metal temperature of the combustion components, including but not limited to combustion liners and transition pieces otherwise known as ducts, increases. A combustion liner is incorporated into a turbine, and defines, in part with a transition piece or duct, an area for a flame to burn fuel, especially residual fuels. A transition piece is in communication with a combustion liner, and further defines, with the combustion liner, a hot gas path for the turbine. However, the increase in firing temperature undesirably reduces rupture and fatigue properties of turbine combustion components, such as combustion liners and ducts. Further, this increase in firing temperature also severely and undesirably degrades oxidation or hot corrosion resistance of combustion components, such as combustion liners and ducts.

Turbine combustion components, such as combustion liners and ducts, are often formed of heat resistant materials. Turbine combustion components, such as combustion liners and ducts, are often coated on inner surfaces with other heat resistant materials. Combustion liners are formed, for example from wrought superalloys, such as but not limited to, Hastelloy alloys, Nimonic alloys, Inconel alloys, and similar alloys. These superalloys do not possess a desirable oxidation resistance at high temperatures, for example at temperatures greater than about 1500° F. Therefore, to reduce the liner temperature and to provide oxidation and corrosion protection against a hot flame inside the combustion liner, a heat resistant coating, such as but not limited to, a bond coat and thermal barrier coating (TBC), are often applied on an inner surface, otherwise known as a hot side. For example, a bond coat and TBC are often utilized in aircraft engine and land based gas turbines.

As flame temperatures rise with a rise in firing temperatures, the outer surface of the combustion liner and the transition duct, otherwise known as a cold side of a combustion liner, often reaches very high temperatures. At the very high temperatures, oxidation and nitridation, especially when assisted by working stresses and thermal cycling, become a severe problem, especially at welds and their heat affected zones (HAZ) in combustion liners and ducts.

FIGS. 1–6 are microphotographs that illustrate at least one of severe grain boundary oxidation and nitridation in combustion liners, which were subjected to very high temperatures. The combustion liner is formed of Hastelloy X. The microphotographs illustrate the crack initiation and propagation along grain boundaries on the outer surface, otherwise known as the cold side, of the combustion liner. In FIGS. 1–4, cracks were initiated at heavily oxidized grain boundaries on outer surfaces of the combustion liners. Whereas in FIGS. 5 and 6, grain boundaries on outer surfaces of the combustion liners were heavily nitrided. Near the outer surfaces, cracks were initiated by oxidation of the nitrides along grain boundaries. The cracks then propagated intergranularly inwardly from the outer surfaces through the combustion liners. Therefore, oxidation and nitridation at outer surfaces of combustion liners are undesirable, and become a life limiting factor. Hot corrosion may also cause failure of a turbine combustion component.

FIG. 1 is a top view of a turbine combustion component at 200 times magnification and FIG. 2 is a bottom view of a turbine combustion component at 500 times magnification, where the cracks are visible due in part to a Kallings etching. FIG. 3 is a top view at 500 times magnification and FIG. 4 is bottom view at 1000 times magnification of a turbine combustion component, where cracks are visible again due in part to a Kallings etching. Both FIG. 3 and FIG. 4 are illustrated at locations outside a heat affected zone of a weld joint. FIG. 5 is at 500 times magnification and FIG. 6 is at 250 times magnification of a turbine combustion component. Both FIG. 5 and FIG. 6 illustrate blocky nitride phases mostly along grain boundaries near the outer surface of a combustion liner. Adjacent to the outer surface of a turbine combustion component, the nitride phase was oxidized to form cracks.

It has been proposed to solve problems associated with combustion liner cracking by reducing the firing temperature in a turbine or by redesigning the combustion liner. While both methods may appear to temporarily solve the problem, it has been discovered that both proposed solutions, reducing a firing temperature in the turbine and redesigning the combustion liner, sacrifice turbine efficiency. Further, both proposed require large amounts of re-work. The sacrifice of efficiency and the large amounts of re-work are, of course, undesirable.

SUMMARY OF THE INVENTION

Therefore, it is desirable to provide a turbine combustion component construction that overcomes the above noted, and other, deficiencies in the related art.

It is therefore desirable to provide a protective coating on an outer surface, otherwise known as a non-flame side, of a turbine combustion component, for example but not limited to a combustion liner and a duct.

Further, it is desirable to provide a turbine combustion system comprising at least one turbine combustion component, where the at least one turbine combustion component comprises an inner surface that defines a hot flame path area and an outer surface. A protective coating is positioned on the outer surface of at least one turbine combustion component to improve at least one of oxidation, nitridation and hot corrosion resistance of the at least one turbine combustion component.

These and other aspects, advantages and salient features of the invention will become apparent from the following 5 detailed description, which, when taken in conjunction with the annexed drawings, disclose the invention.

BRIEF DESCRIPTION OF THE DRAWINGS

While the novel features of this invention are set forth in the following description, the invention will now be described from the following detailed description of the invention taken in conjunction with the drawings, in which.

DETAILED DESCRIPTION OF THE INVENTION

Figure 1:
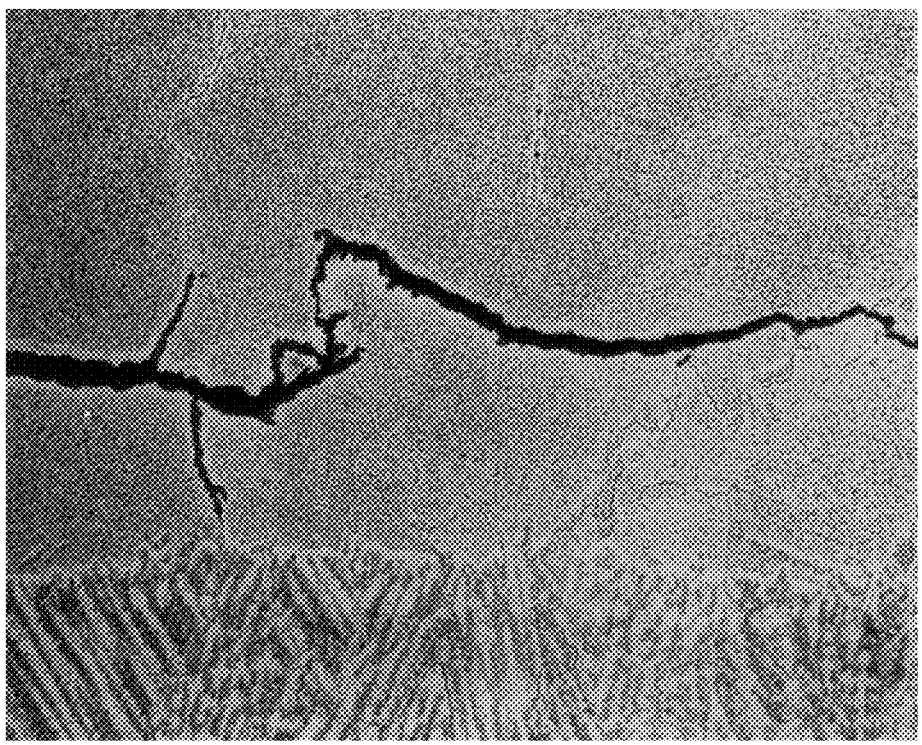
FIG. 1 is a microphotograph illustration at 200 times magnification of severe grain boundary oxidation in a combustion liner that was subjected to very high temperatures.
Figure 2:
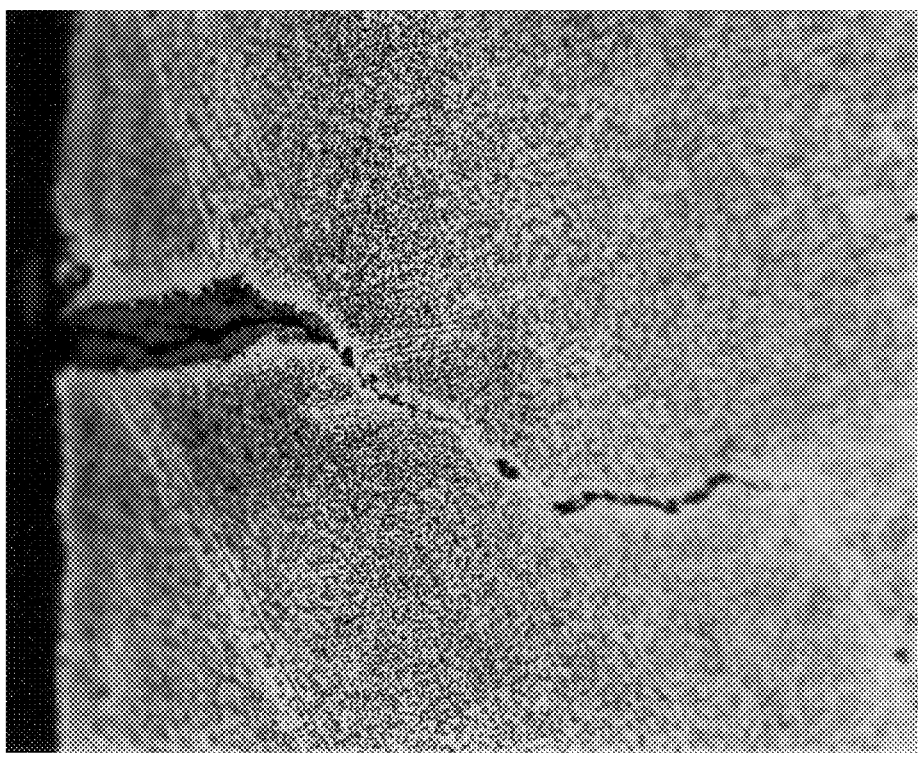
FIG. 2 is a microphotograph illustration at 500 times magnification of severe grain boundary oxidation on the outer surface of the combustion liner that was subjected to very high temperatures in FIG. 1.
Figure 3:
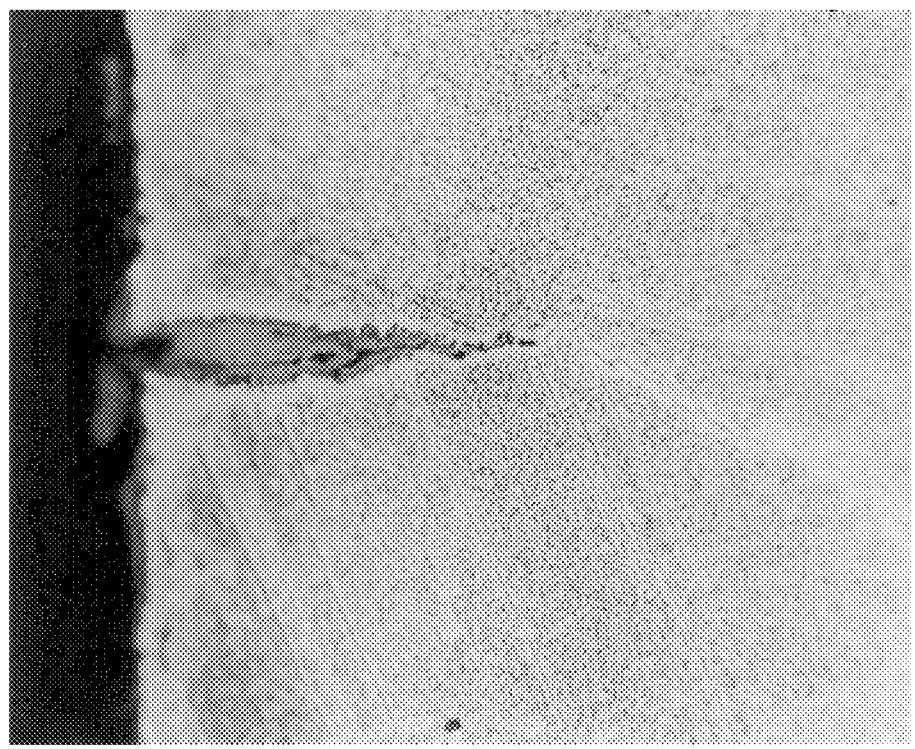
FIG. 3 is a microphotograph illustration at 200 times magnification of severe grain boundary oxidation on the outer surface of another combustion liner that was subjected to very high temperatures.
Figure 4:
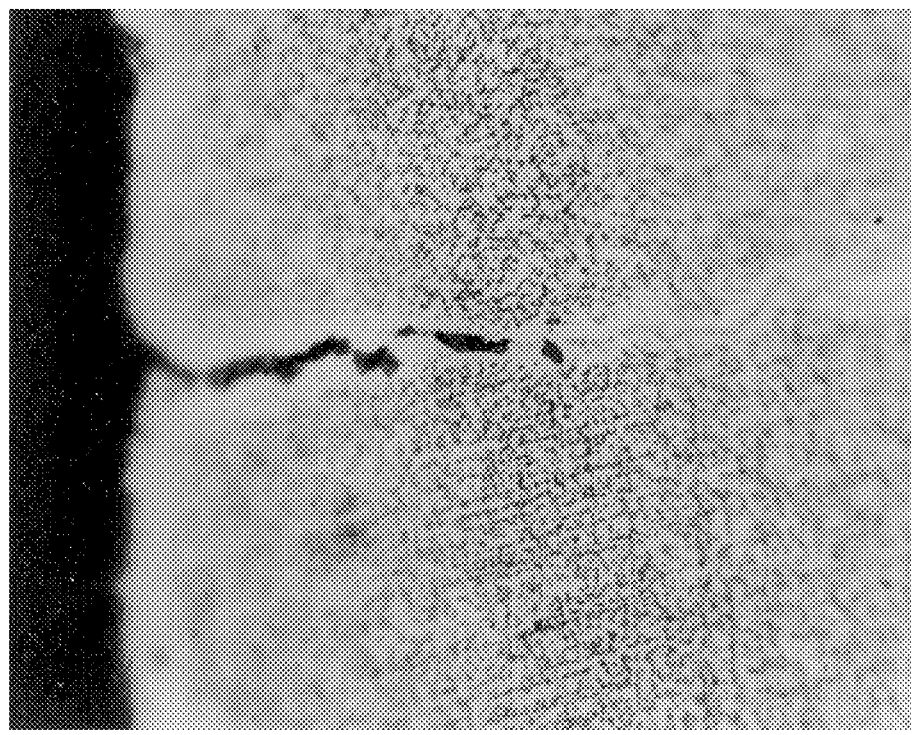
FIG. 4 is a microphotograph illustration at 500 times magnification of severe grain boundary oxidation on the outer surface of the another combustion liner that was subjected to very high temperatures in FIG. 3.
Figure 5:
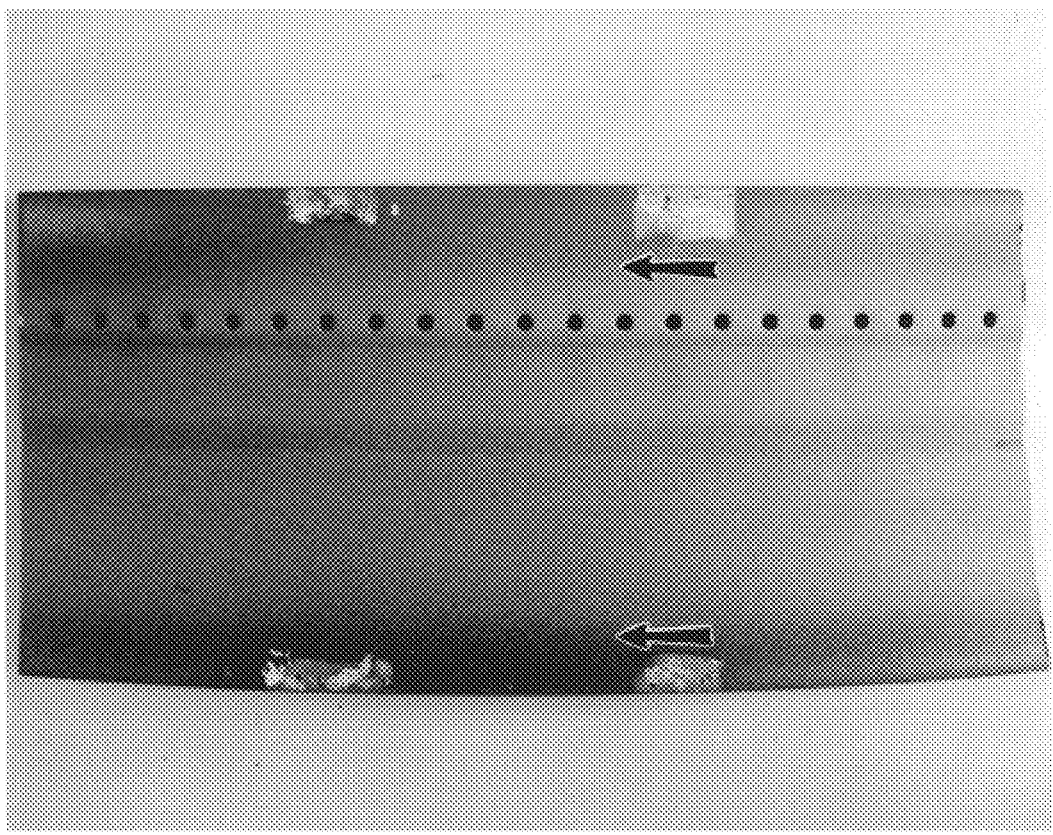
FIG. 5 is a microphotograph illustration at 500 times magnification of severe grain boundary nitridation and oxidation on an outer surface of another combustion liner that was subjected to very high temperatures.
Figure 6:
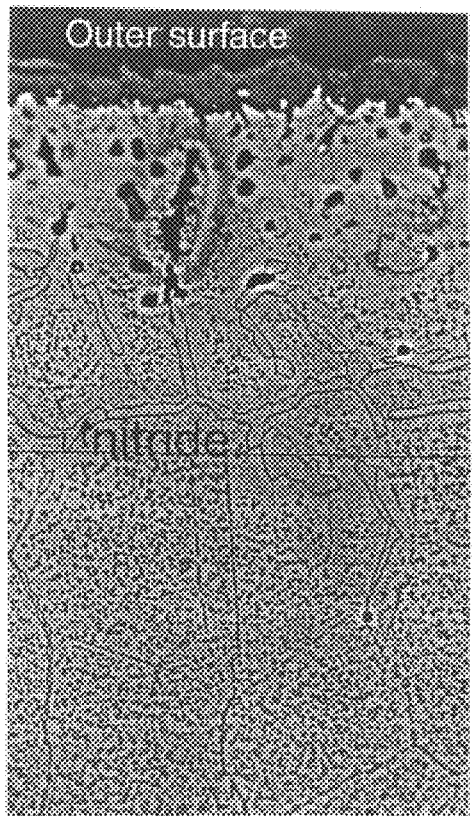
FIG. 6 is a microphotograph illustration at 500 times magnification of severe grain boundary nitridation and oxidation on an outer surface of yet another combustion liner that was subjected to very high temperatures.

Protective bond coatings and TBCs 25 (FIGS. 8 and 9) are applied to inner surfaces or hot surfaces of turbine combustion components in a turbine system, such as combustion liners or ducts. The protective bond coatings and TBCs 25 reduce the component metal temperature and to provide oxidation and corrosion protection against a hot flame inside combustion components, are generally known in the art.

However, as discussed above, as flame temperatures inside a turbine rise for a desirable increase in efficiency, the temperature on the outer surface of a turbine combustion component, such as a combustion liner, often reaches very high temperatures. At these very high temperatures, oxidation and nitridation become a severe problem. The problems are especially evident at welds and their associated heat affected zones (HAZ). Moreover, the problems are especially severe on outer surfaces of combustion liners and ducts. The invention will be described hereinafter with respect to a combustion liner, however the scope of the invention comprises other turbine combustion components, such as a duct or transition piece, that form a portion of the hot gas path.

Severe grain boundary oxidation and nitridation often occur in combustion liners that are subjected to very high temperatures. FIGS. 1–6, as discussed above, illustrate cracks initiated at heavily oxidized and nitrided grain boundaries on outer surfaces of the combustion liners. The cracks propagate intergranularly from an outer surface inwardly through the combustion liner. Therefore, oxidation at outer surfaces of the combustion liner is extremely undesirable, and becomes a life limiting factor of the liner. Thus, it is desirable to prevent oxidation and nitridation, and the formation of cracks, at oxidized and nitrided grain boundaries.

Therefore, as embodied in the invention, it has been determined that in order to prevent undesirable combustion liner cracking at outer surfaces, a protective coating is applied to an outer surface of a turbine combustion component in a turbine system. The turbine combustion component comprises any turbine combustion component that defines a hot flame path in the turbine, such as but not limited to at least one of a combustion liner and duct. The protective coating is applied to the turbine combustion component at desired locations on the outer surface, for example applied at weld joints and associated HAZs. Alternatively, the protective coatings are applied to the whole outer surface of the turbine combustion component.

The protective coating on the outer surface, otherwise known as a non-flame surface, of a turbine combustion component lessens, and often prevents, oxidation and nitridation on the outer surface. Accordingly, the protective coating on the outer surface prevents or at least slows down crack initiation and propagation.

The protective coating on the outer surface of a turbine component is formed from known materials possessing at least one of oxidation and hot corrosion resistance compositions. Preferably, the protective coating composition provides at least one of, and preferably both, very good oxidation resistance and hot-corrosion resistance. For example, but in no way limiting of the invention, the protective coating compositions on outer surfaces of turbine combustion components comprise platinum-aluminides; aluminides; and MCrAlY coatings, where M comprises, but is not limited to, one of Ni and Co. Thus, MCrAlY comprises materials, such as but not limited to, NiCrAlY, for example Praxair NI-211: 67Ni-22Cr-10Al-1Y (weight percentage); CoCrAlY, for example Praxair CO-147: 61.5Co-25Cr-10.5Al-3Hf (weight percentage); and CoNiCrAlY, for example Praxair CO-211: 38.5Co-32Ni-21Cr-8Al-0.5Y (weight percentage). Further, it has been determined that CoNiCrAlY provides an effective protective coating for a turbine combustion component with desirable hot corrosion resistance.

Furthermore, the coating composition should provide physical desirable properties for the turbine combustion components. These desirable physical properties include, but are not limited to, at least one of, oxidation resistance; protection against nitridation; good hot corrosion resistance; compatibility with a substrate, otherwise known as the liner base metal; and formation of a dense coating. Further, the coating compositions should form dense protective alumina or chromia scales. These dense alumina or chromia scales can prevent nitrogen penetration, thus prevent nitridation of the liner base metal.

Figure 7:
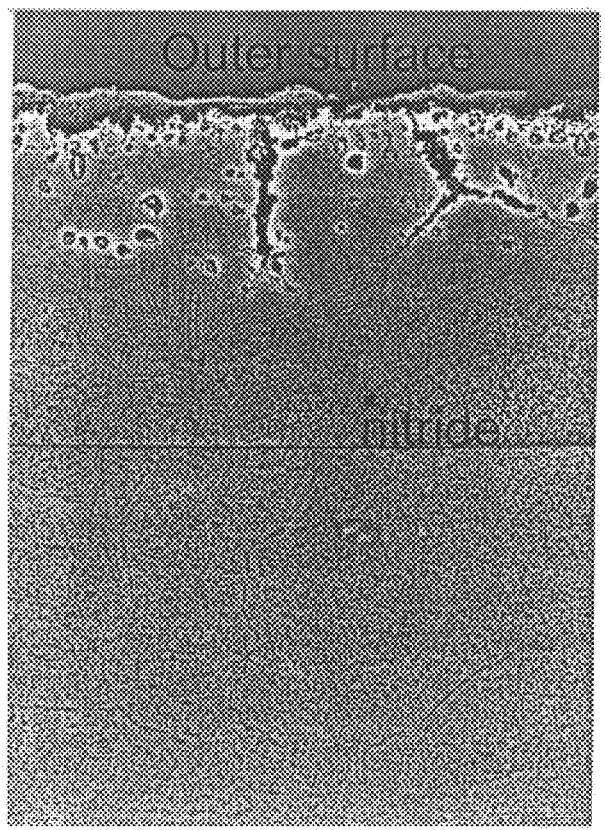
FIG. 7 is a microphotograph illustration of a coating on an outer surface of a piece cut from a combustion liner.

FIG. 7 is a microphotograph that illustrates a protective coating, as embodied by the invention, on the outer surface of a turbine combustion component, for example a combustion liner. The microphotograph of FIG. 7 illustrates a section cut from a Hastelloy combustion liner with a NiCrAlY coating (Praxair Nl-211: 67Ni-22Cr-10Al-1Y (weight percentage)) applied on its outer surface. The protective coating comprises an oxidation resistant coating about 10 mils thick. The inner side of the combustion liner is provided with a TBC. The protective coating is provided on the outer surface of the combustion liner by an appropriate process, for example but not limited to, a hypervelocity oxy-fuel (HVOF) thermal spray process. The coated area on the outer surface of the combustion liner is visible between the two arrows.

Figure 9:
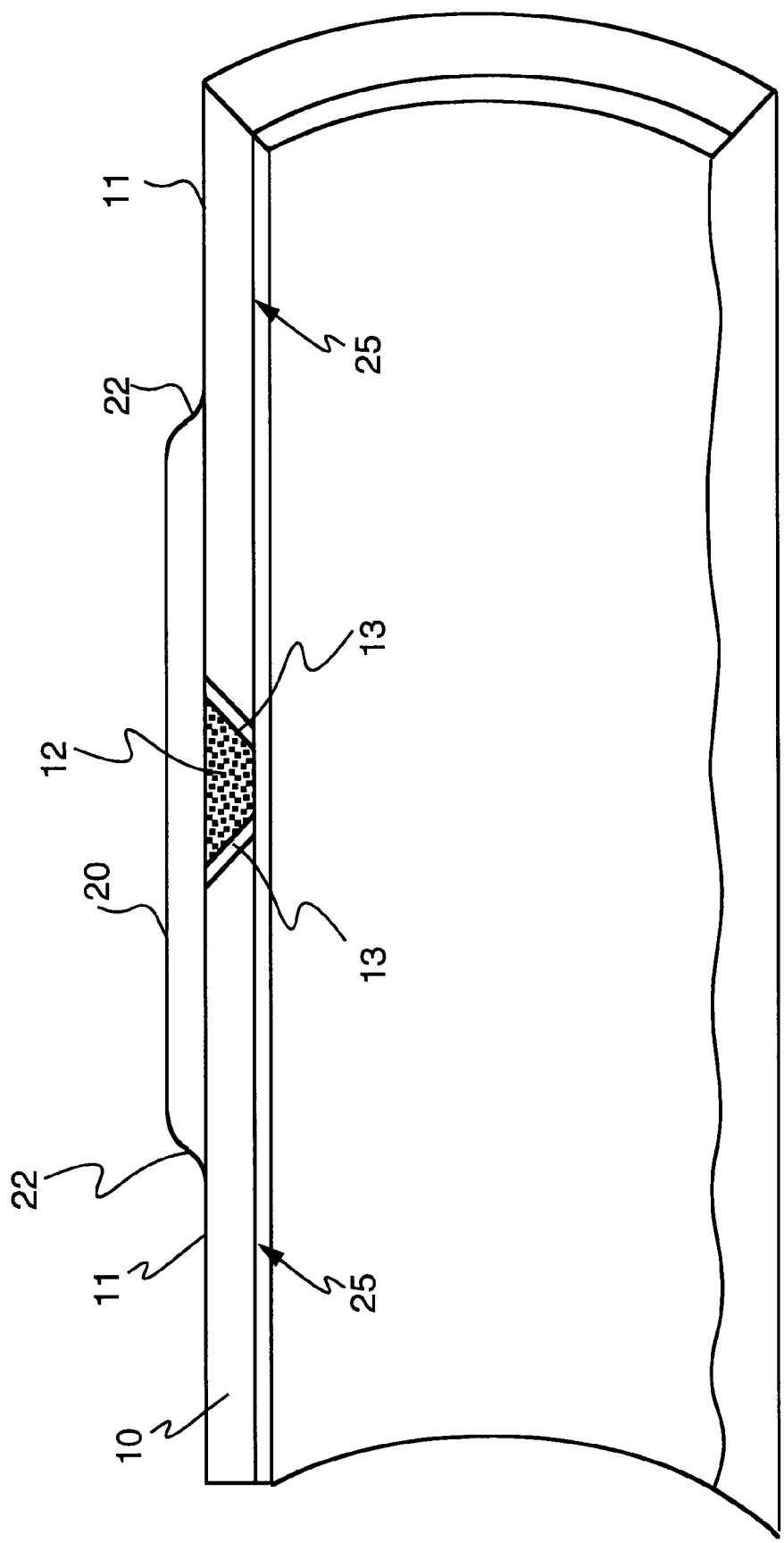
FIG. 9 is a side sectional schematic illustration of a coating on an outer surface of selected regions of a turbine combustion component.

Further, the protective coating, as embodied by the invention, comprises a gradual decrease in the protective coating thickness at the edges of the coating area. The microphotograph of FIG. 7 illustrates the gradual decrease in thickness at the edges, and FIG. 9 illustrates an exaggerated gradual decrease in thickness in a side schematic illustration (for purposes of ease of illustration the gradual decrease in thickness is exaggerated in FIG. 9). The gradual decrease in the protective coating thickness is provided to at least edges of the coating area. The gradual decrease in thickness at the edges of the coating on the outer surface of the turbine combustion component provides an enhanced low cycle fatigue (LCF) resistance. The gradual decrease in thickness at the edges of the coating on the turbine combustion component also prevents spallation of the coating.

The protective coating on the outer surface of turbine combustion component is formed with a thickness in a range between about less than one mil to about dozens of mils. Preferably, the protective coating on the outer surface of a turbine combustion component is formed with a thickness in a range between about 2 mils to about 10 mils.

The protective coating on the outer surface of a turbine component, as embodied by the invention, is applied by an appropriate known coating methods. The coating method, as embodied by the invention, includes coating methods, such as but not limited to, hyper-velocity oxy-fuel (HVOF), air and vacuum plasma spray, physical vapor deposition (PVD), chemical vapor deposition (CVD), pack cementation, electroplating, and other known coating methods. As embodied by the invention, the protective coating is relatively very dense, so that oxidation resistance is increased. Therefore, a coating method, such as HVOF, which provides very dense oxidation resistant coatings, is desirable.

Figure 8:
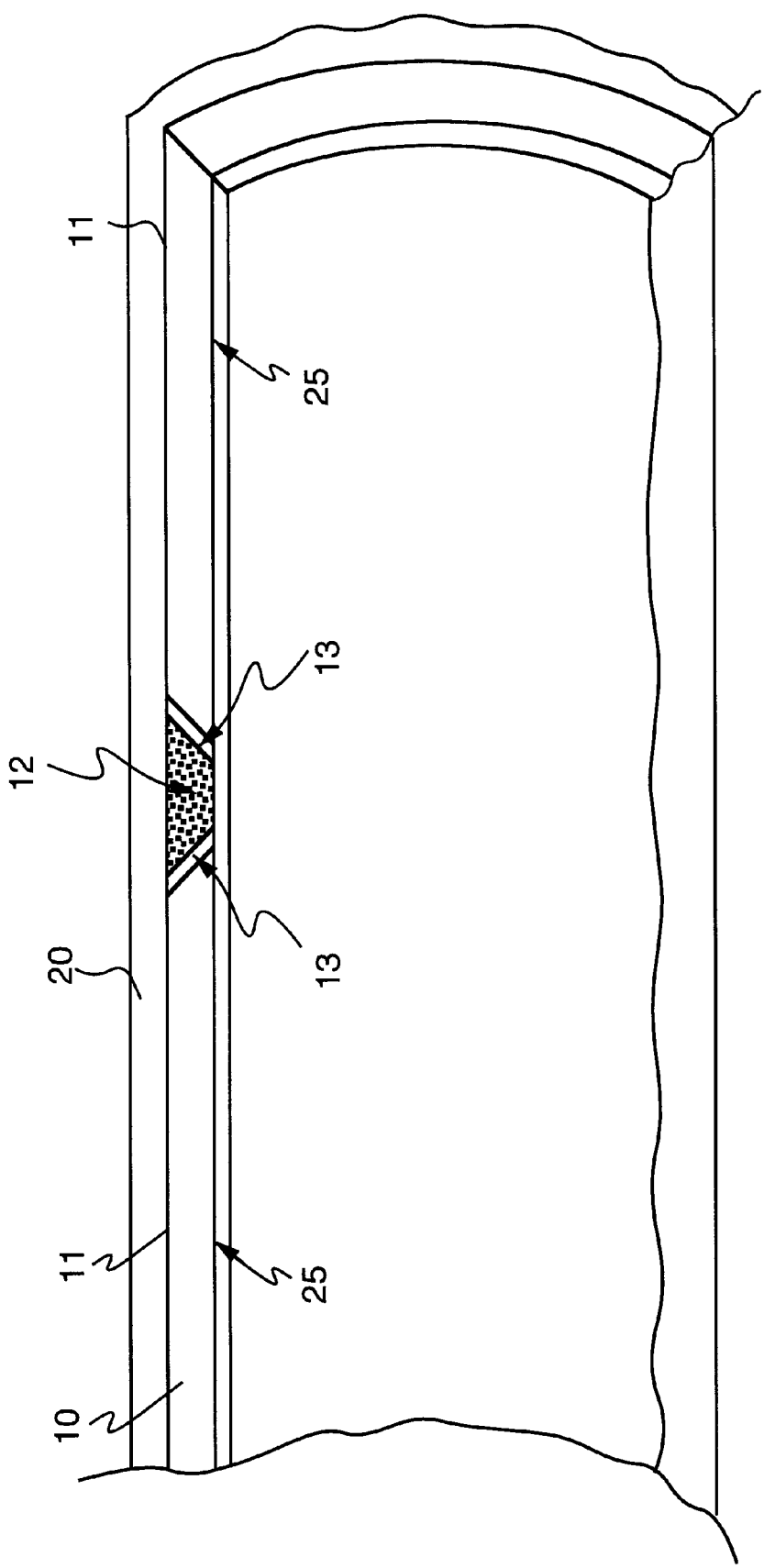
FIG. 8 is a side sectional schematic illustration of a coating on an outer surface of a turbine combustion component.

The protective coating on the outer surface of a turbine combustion component, such as but not limited to at least one of a combustion liner and duct, is applied to an entire outer surface, as illustrated in FIG. 8. The exact shape and configuration of the turbine combustion component, such as but not limited to at least one of a combustion liner and duct, are determined based on the shape and configuration of the turbine. However, the exact shape and configuration of the turbine combustion component form no part of the invention.

In FIG. 8, the turbine combustion component, such as but not limited to at least one of a combustion liner and duct, 10 comprises a protective coating 20 that is applied to the outer surface 11. The protective coating 20, as illustrated in FIG. 8, covers the entire outer surface. Thus, the HAZ 13 and weld 12 areas are protected by the coating. FIG. 8 also illustrates an inner coating 25 on the turbine combustion component 10.

Alternatively, the protective coating on the outer surface of a turbine combustion component, such as but not limited to at least one of a combustion liner and duct, is applied to selected areas of the outer surface, as illustrated in FIG. 9. For example, the coating 20 on the outer surface 11 of a turbine combustion component, such as but not limited to at least one of a combustion liner and duct, 10 is applied to the areas proximate welds 12 and associated HAZs 13. As another example, the coating 20 on the outer surface 11 of the turbine combustion component, such as but not limited to at least one of a combustion liner and duct, 10 may be applied to known hot spots where exposure temperatures are higher than that of the rest of the component. FIG. 9 also illustrates an inner coating 25 on the turbine combustion component 10.

FIG. 9 further illustrates a coating 20 on a turbine combustion component, such as but not limited to at least one of a combustion liner and duct, 10, where the coating 20 is provided with a gradual decrease in thickness at the edges 22 of the coating area. The gradual decrease in thickness at the edges 22 of the coating 20 on a turbine combustion component, such as but not limited to at least one of a combustion liner and duct, 10 provides an enhanced low cycle fatigue resistance and can prevent spallation of coating 20.

Figure 10:
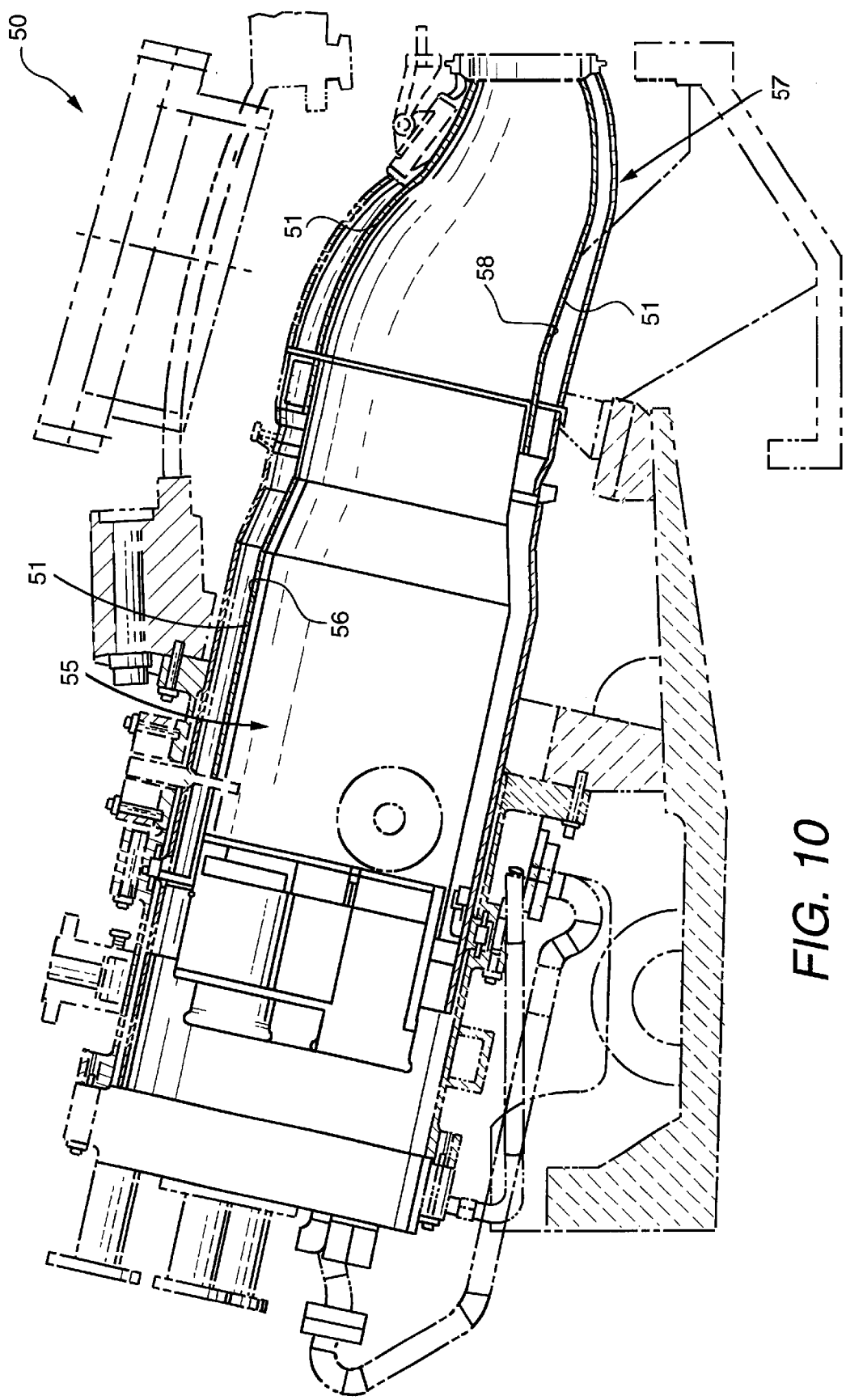
FIG. 10 is a side sectional schematic illustration of a turbine combustion system.

FIG. 10 is a side sectional schematic illustration of a turbine combustion system 50. For ease of understanding, the features of the turbine combustion system 50 that do not form features of the invention, per se, are illustrated in phantom. In FIG. 10, a combustion liner 55 and a duct, otherwise known as a transition piece, 57 are both provided with a coating 51 on outer surfaces, 56 and 58, respectively. However, the scope of the invention is such that at least one of a combustion liner 55 and duct 57, or both, are provided with the outer coating 51. The representation of the turbine combustion system in FIG. 10 is in no way meant to be limiting the invention.

While the embodiments are described herein, it will be appreciated from the specification that various combinations of elements, variations or improvements therein may be made by those skilled in the art that are within the scope of the invention.

We claim:

1. A turbine combustion system comprising:

at least one turbine combustion component comprising an inner surface that defines a hot flame path area; the at least one turbine component selected from a combustion liner and a duct, the at least one turbine component further comprising an outer surface, at least one weld, and a heat affected zone disposed at the at least one weld; and a protective coating contacting and disposed on the outer surface of at least one turbine component to form a coating area at the at least one weld, the heat affected zone and an area immediately proximate thereto, the protective coating comprising a dense, low-oxide content coating, the protective coating being disposed on the at least one turbine component by a high-velocity oxygen-fuel process that provides the dense, low-oxide content coating, wherein the thickness of said protective coating is gradually decreased at edges of the coating area on the outer surface of the at least one turbine component improving spall resistance of the coating and wherein the protective coating improving nitridation resistance and at least one of oxidation and hot corrosion resistance of the at least one turbine combustion component at least one the at least one weld, the heat affected zone and the area immediately proximate thereto.

2. A turbine combustion system according to claim 1, wherein at least one turbine combustion component comprises a combustion liner.

3. A turbine combustion system according to claim 1, wherein the protective coating is formed from a material selected from the group consisting of:

platinum-aluminides; aluminides; and MCrAlY, where M is selected from the group consisting of:
Ni and Co.

4. A turbine combustion system according to claim 1, wherein the protective coating comprises a material selected from the group consisting of:

NiCrAlY; CoCrAlY; and CoNiCrAlY.

5. A turbine combustion system according to claim 1, wherein the protective coating forms dense protective scales, the dense protective scales comprising at least one of alumina scales and chromia scales.

6. A turbine combustion system according to claim 1, wherein the protective coating is provided on the outer surface in a thickness comprising a range between about 2 mils to about 10 mils.

7. In a turbine combustion system, the turbine combustions system having at least one turbine combustion component, the at least one turbine component selected from a combustion liner and a duct, the at least one turbine component comprising an inner surface that defines a hot flame path area; the at least one turbine component further comprising an outer surface, at least one weld, and a heat affected zone disposed at the at least one weld;

a protective coating contacting and disposed on the outer surface of at least one turbine component to form a coating area at the at least one weld, the heat affected zone and an area immediately proximate thereto, the protective coating comprising a dense, low-oxide content coating, the protective coating being disposed on the at least one turbine component by a high-velocity oxygen-fuel process that provides the dense, low-oxide content coating, wherein the thickness of said protective coating is gradually decreased at edges of the coating area on the outer surface of the at least one turbine component improving spall resistance of the coating and wherein the protective coating improving nitridation resistance and at least one of oxidation and hot corrosion resistance of the at least one turbine combustion component at least one the at least one weld, the heat affected zone and the area immediately proximate thereto.

8. In a turbine combustion system according to claim 7, wherein at least one turbine combustion component comprises a combustion liner.

9. In a turbine combustion system according to claim 7, wherein the protective coating is formed from a material selected from the group consisting of:

platinum-aluminides; aluminides; and MCrAlY, where M is selected from the group consisting of:

Ni and Co.

10. In a turbine combustion system according to claim 7, wherein the protective coating comprises a material selected from the group consisting of:

NiCrAlY; CoCrAlY; and CoNiCrAlY.

11. In a turbine combustion system according to claim 7, wherein the protective coating forms dense protective scales, the dense protective scales comprising at least one of alumina scales and chromia scales.

12. In a turbine combustion system according to claim 7, wherein the protective coating is provided on the outer surface in a thickness comprising a range between about 2 mils to about 10 mils.

* * * * *